(12) United States Patent
Mcbride et al.

(10) Patent No.: US 10,892,668 B2
(45) Date of Patent: Jan. 12, 2021

(54) COOLING SYSTEMS FOR COOLING ELECTRIC MACHINES WITHIN ELECTRIFIED VEHICLES

(71) Applicant: FORD GLOBAL TECHNOLOGIES, LLC, Dearborn, MI (US)

(72) Inventors: Thomas Mcbride, Livonia, MI (US); James Trent, South Lyon, MI (US); Megan Gould, Plymouth, MI (US); Gregory Montie, White Lake, MI (US); Brandon David Lint, Dexter, MI (US); Mahindra Dev Imadabathuni, Troy, MI (US); Jason Michael Sanderson, Farmington Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 6 days.

(21) Appl. No.: 16/382,524

(22) Filed: Apr. 12, 2019

(65) Prior Publication Data

US 2020/0328656 A1 Oct. 15, 2020

(51) Int. Cl.
*H02K 9/19* (2006.01)
*H02K 3/24* (2006.01)
*B60K 6/365* (2007.10)
*B60K 6/405* (2007.10)
*B60K 6/26* (2007.10)

(52) U.S. Cl.
CPC ............... *H02K 9/19* (2013.01); *B60K 6/365* (2013.01); *B60K 6/405* (2013.01); *H02K 3/24* (2013.01); *B60K 6/26* (2013.01)

(58) Field of Classification Search
CPC .......... H02K 9/005; H02K 9/19; H02K 6/197; H02K 3/24; H02K 3/505; H02K 5/20
See application file for complete search history.

(56) References Cited

U.S. PATENT DOCUMENTS

| 2,873,393 | A | * | 2/1959 | Baudry | ................. | H02K 9/005 310/55 |
| 3,577,024 | A | | 5/1971 | Inagaki et al. | | |
| 3,609,420 | A | * | 9/1971 | Inagaki | .................. | H02K 9/197 310/54 |
| 4,517,479 | A | * | 5/1985 | Aleem | ................... | H02K 9/197 310/260 |
| 4,598,223 | A | * | 7/1986 | Glennon | .................. | H02K 3/24 310/208 |

(Continued)

FOREIGN PATENT DOCUMENTS

EP 2900506 B1 8/2018

*Primary Examiner* — Dang D Le
(74) *Attorney, Agent, or Firm* — David B. Kelley; Carlson, Gaskey & Olds

(57) ABSTRACT

This disclosure details cooling systems for cooling electric components, such as electric machines, within electrified vehicles. Exemplary cooling systems may include a spray bar positioned relative to a rear face of a stator of the electric machine. In some embodiments, the spray bar may be positioned axially between the rear face of the stator and a torque converter housing. One or more nozzles of the spray bar are configured to direct a coolant between adjacent back irons of the stator, onto end windings of the stator, or both. Actively cooling the stator allows the electric machine to operate at higher torques and speeds, thereby increasing performance.

20 Claims, 8 Drawing Sheets

(56) References Cited

U.S. PATENT DOCUMENTS

| | | | |
|---|---|---|---|
| 4,958,095 A * | 9/1990 | Uchida | F02N 11/04 |
| | | | 123/41.31 |
| 5,519,269 A | 5/1996 | Lindberg | |
| 7,239,055 B2 | 7/2007 | Burgman et al. | |
| 7,705,495 B2 | 4/2010 | Alfermann et al. | |
| 7,952,240 B2 * | 5/2011 | Takenaka | H02K 1/20 |
| | | | 310/54 |
| 8,786,146 B2 * | 7/2014 | Cai | H02K 9/19 |
| | | | 310/260 |
| 9,306,433 B2 | 4/2016 | Sten et al. | |
| 9,581,210 B2 | 2/2017 | Frait et al. | |
| 9,653,961 B2 | 5/2017 | Silva | |
| 2008/0024020 A1 * | 1/2008 | Iund | B60L 1/02 |
| | | | 310/61 |
| 2010/0013330 A1 * | 1/2010 | Rodriguez Rodriguez | |
| | | | H02K 5/20 |
| | | | 310/54 |
| 2013/0009400 A1 | 1/2013 | Pickard | |
| 2018/0138784 A1 * | 5/2018 | Lassila | H02K 9/19 |

* cited by examiner

COOLING SYSTEMS FOR COOLING ELECTRIC MACHINES WITHIN ELECTRIFIED VEHICLES

TECHNICAL FIELD

This disclosure relates to cooling systems that include spray bars for cooling components within electrified vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines (e.g., electric motors). Conventional motor vehicles, by contrast, rely exclusively on the internal combustion engine to propel the vehicle. A high voltage traction battery pack typically powers the electric machines and other electrical loads of the electrified vehicle.

Electric machines can generate a significant amount of heat when operating at low speed/high torque conditions. The functionality of electric machines may be limited if the generated heat is not actively managed.

SUMMARY

A transmission system according to an exemplary aspect of the present disclosure includes, among other things, an electric machine including a rotor and a stator, and a spray bar positioned adjacent to a rear face of the stator. A first nozzle of the spray bar is configured to direct a coolant between adjacent back irons of the stator, onto end windings of the stator, or both.

In a further non-limiting embodiment of the foregoing transmission system, the spray bar is positioned axially between the rear face of stator and a torque converter of the transmission system.

In a further non-limiting embodiment of either of the foregoing transmission systems, the spray bar is located near a top edge of the stator that coincides with a twelve o'clock position of the stator in its mounted position within the transmission system.

In a further non-limiting embodiment of any of the foregoing transmission systems, the spray bar includes a crescent shaped body.

In a further non-limiting embodiment of any of the foregoing transmission systems, the spray bar covers between 60 degrees and 180 degrees of the rear face of stator.

In a further non-limiting embodiment of any of the foregoing transmission systems, the first nozzle is configured to direct the coolant between the adjacent back irons of the stator, and a second nozzle is configured to direct the coolant onto the end windings of the stator.

In a further non-limiting embodiment of any of the foregoing transmission systems, the first nozzle includes a first orifice having a first diameter and the second nozzle includes a second orifice having a second diameter. The first diameter is larger than the second diameter.

In a further non-limiting embodiment of any of the foregoing transmission systems, the spray bar is directly attached to the rear face of the stator.

In a further non-limiting embodiment of any of the foregoing transmission systems, the spray bar includes a piloting surface received within a groove of the stator.

In a further non-limiting embodiment of any of the foregoing transmission systems, the spray bar is suspended within an open space defined between the rear face of the stator and a torque converter housing.

An electrified vehicle according to another exemplary aspect of the present disclosure includes, among other things, a front module at least partially housing an electric machine, a transmission gearbox aft of the front module, a torque converter located axially between the front module and the transmission gearbox, and a spray bar positioned axially between a rear face of a stator of the electric machine and a housing of the torque converter.

In a further non-limiting embodiment of the foregoing electrified vehicle, a feed tube is connected to the front module by a first mounting attachment and connected to the spray bar by a second mounting attachment.

In a further non-limiting embodiment of either of the foregoing electrified vehicles, the feed tube is in fluid communication with a coolant passage formed in the front module at the first mounting attachment and is in fluid communication with a hollow section of the spray bar at the second mounting attachment.

In a further non-limiting embodiment of any of the foregoing electrified vehicles, the spray bar includes a crescent shaped body.

In a further non-limiting embodiment of any of the foregoing electrified vehicles, the spray bar covers between 60 degrees and 180 degrees of the rear face of stator.

In a further non-limiting embodiment of any of the foregoing electrified vehicles, the spray bar is located near a top edge of the stator, and the top edge coincides with a twelve o'clock position of the stator.

In a further non-limiting embodiment of any of the foregoing electrified vehicles, the spray bar includes a plurality of nozzles that protrude from a front face of the spray bar.

In a further non-limiting embodiment of any of the foregoing electrified vehicles, a first portion of the plurality of nozzles is configured to direct a coolant between adjacent back irons of the stator, and a second portion of the plurality of nozzles is configured to direct the coolant onto end windings of the stator.

In a further non-limiting embodiment of any of the foregoing electrified vehicles, the first portion of the plurality of nozzles includes a first orifice having a first diameter and the second portion of the plurality of nozzles includes a second orifice having a second diameter. The first diameter is larger than the second diameter.

In a further non-limiting embodiment of any of the foregoing electrified vehicles, the spray bar is positioned relative to a top edge of the stator but not relative to a bottom edge of the stator.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details cooling systems for cooling electric components, such as electric machines, within electrified vehicles. Exemplary cooling systems may include a spray bar positioned relative to a rear face of a stator of the electric machine. In some embodiments, the spray bar may be positioned axially between the rear face of the stator and a torque converter housing. One or more nozzles of the spray bar are configured to direct a coolant between adjacent back irons of the stator, onto end windings of the stator, or both. Actively cooling the stator allows the electric machine to operate at higher torques and speeds, thereby increasing the performance capabilities of the electric machine. These and other features are discussed in greater detail in the following paragraphs of this detailed description.

Figure 1:
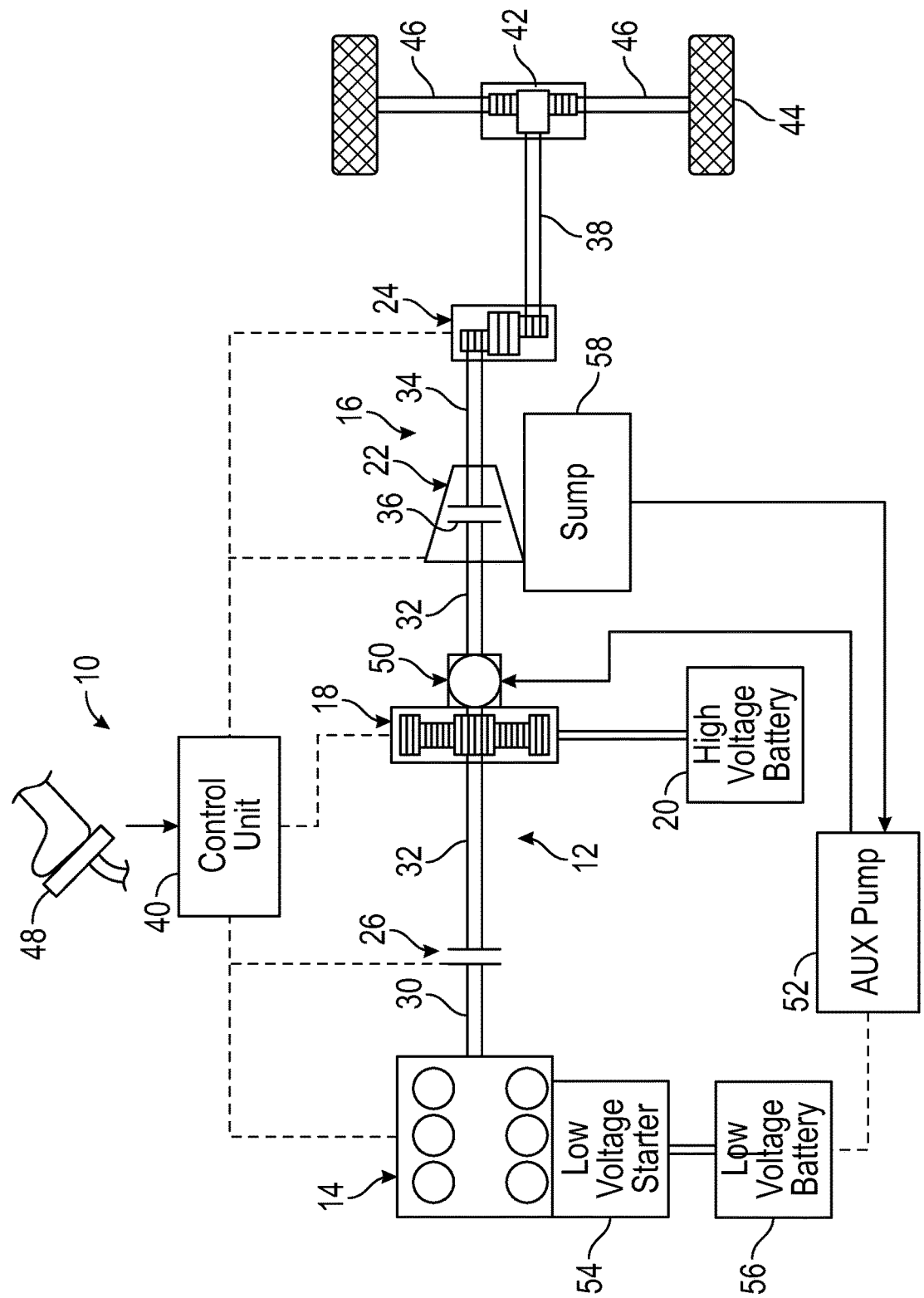
FIG. 1 schematically illustrates an exemplary powertrain of an electrified vehicle.

FIG. 1 schematically illustrates an electrified vehicle 10. Although illustrated as a hybrid electric vehicle (HEV) in some embodiments, this disclosure is applicable any type of electrified vehicle, including but not limited to full hybrid electric vehicles (FHEVs), plug-in hybrid electric vehicles (PHEVs), and battery electric vehicles (BEVs). In addition, although a specific component relationship is illustrated in FIG. 1, this illustration is not intended to limit this disclosure. In other words, it should be readily understood that the placement and orientation of the various components of the electrified vehicle 10 could vary within the scope of this disclosure.

The exemplary electrified vehicle 10 includes a powertrain 12. The powertrain 12 may include an engine 14 and a transmission system 16 that is selectively driven by the engine 14. In an embodiment, the transmission system 16 is a modular hybrid transmission (MHT). The transmission system 16 may include an electric machine 18 that is powered by a high voltage battery pack 20, a torque converter 22, and a multiple-step ratio automatic transmission, or gearbox 24. In an embodiment, the electric machine 18 is configured as an electric motor. However, the electric machine 18 could alternatively be configured as a generator or a combined motor/generator within the scope of this disclosure.

The engine 14 and the electric machine 18 may both be employed as available drive sources for propelling the electrified vehicle 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is engaged.

In some embodiments, the engine 14 is started using the electric machine 18 to rotate the engine 14 using torque provided through the engine disconnect clutch 26. Alternatively, the electrified vehicle 10 may be equipped with a low voltage starter 54 operatively connected to the engine 14, for example, through a belt or gear drive. The starter 54 may be used to provide torque to start the engine 14 without the addition of torque from the electric machine 18. The starter 54 may be powered by the high voltage battery pack 20, or the electrified vehicle 10 can include a low voltage battery 56 to provide power to the starter 54 and/or other vehicle components.

The electric machine 18 may be any one of a plurality of types of electric machines. In an embodiment, the electric machine 18 is a permanent magnet synchronous motor.

When the engine disconnect clutch 26 is at least partially engaged, power flow from the engine 14 to the electric machine 18 or from the electric machine 18 to the engine 14 is possible. For example, the engine disconnect clutch 26 may be engaged and the electric machine 18 may operate as a generator to convert rotational energy provided by a crankshaft 30 and an electric machine shaft 32 into electrical energy to be stored in the battery pack 20. The engine disconnect clutch 26 can also be disengaged to isolate the engine 14 from the remainder of the powertrain 12 such that the electric machine 18 can act as the sole power source for propelling the electrified vehicle 10.

The electric machine shaft 32 may extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 is adapted to transmit power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with the torque converter 22 is but a non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 may also be referred to as a final drive. The differential 42 drives a pair of wheels 44 via respective axles 46 that are connected to the differential 42. In an embodiment, the differential 42 transmits approximately equal torque to each wheel 44 while permitting slight speed differences, such as when the vehicle turns a corner. Different types of differentials or similar devices may be used to distribute torque from the powertrain 12 to one or more of the wheels 44. In some applications, torque distribution may vary depending on the particular operating mode or condition, for example.

Pressurized fluid for the transmission system 16 may be provided by a transmission pump 50. The transmission pump 50 may be connected to or adjacent to the electric machine 18 such that it rotates with the electric machine 18 and the electric machine shaft 32 to pressurize and provide sufficient line pressure for full operation of the transmission gearbox 24. When the portion of the electric machine shaft 32 containing the transmission pump 50 is at rest, the transmission pump 50 is also at rest and is inactive.

In order to provide pressurized transmission fluid when the transmission pump 50 is inactive, an auxiliary pump 52 can also be provided. The auxiliary pump 52 may be electrically powered, for example by the low voltage battery 56. In some embodiments, the auxiliary pump 52 provides a portion of the transmission fluid for the transmission gearbox 24 such that the transmission gearbox 24 is limited in operation, for example to certain actuators or gearing ratios, when the auxiliary pump 52 is operating.

Cooled transmission fluid, such as oil, may settle in a sump 58 from the torque converter 22. The auxiliary pump 52 may pump transmission fluid from the sump 58 to the transmission pump 50 during certain conditions.

The powertrain 12 may additionally include an associated control unit 40. While schematically illustrated as a single controller, the control unit 40 may be part of a larger control system and may be controlled by various other controllers throughout the electrified vehicle 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the battery pack 20, selecting or scheduling transmission shifts, actuating the engine disconnect clutch 26, etc. In an embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control unit 40 may communicate signals to and/or from the engine 14, the engine disconnect clutch 26, the electric machine 18, the torque converter bypass clutch 36, the transmission gearbox 24, and/or other components. Although not explicitly illustrated, those of ordinary skill in the art will recognize various functions or components that may be controlled by the control unit 40 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the electrified vehicle 10 to provide a demanded torque, power, or drive command to propel the electrified vehicle 10. In general, depressing and releasing the accelerator pedal 48 generates an accelerator pedal position signal that may be interpreted by the control unit 40 as a demand for increased power or decreased power, respectively. Based at least upon input from the accelerator pedal 48, the control unit 40 may command torque from the engine 14 and/or the electric machine 18. The control unit 40 also controls the timing of gear shifts within the transmission gearbox 24, as well as engagement or disengagement of the engine disconnect clutch 26 and the torque converter bypass clutch 36. Like the engine disconnect clutch 26, the torque converter bypass clutch 36 can be modulated across a range between the engaged and the disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the electrified vehicle 10 with the engine 14, the engine disconnect clutch 26 is at least partially engaged to transfer at least a portion of the engine torque through the engine disconnect clutch 26 to the electric machine 18, and then from the electric machine 18 through the torque converter 22 and the transmission gearbox 24. The electric machine 18 may assist the engine 14 by providing additional power to turn the electric machine shaft 32. This operation mode may be referred to as a "hybrid mode" or an "electric assist mode."

To drive the electrified vehicle 10 using the electric machine 18 as the sole power source, the power flow remains the same except the engine disconnect clutch 26 isolates the engine 14 from the remainder of the powertrain 12. Combustion in the engine 14 may be disabled or otherwise turned OFF during this time to conserve fuel. The power electronics (not shown) may convert DC voltage from the battery pack 20 into AC voltage to be used by the electric machine 18. The control unit 40 may command the power electronics to convert voltage from the battery pack 20 to an AC voltage provided to the electric machine 18 to provide positive or negative torque to the electric machine shaft 32. This operation mode may be referred to as an "electric only" or "EV" operation mode.

In any mode of operation, the electric machine 18 may act as a motor and provide a driving force for the powertrain 12. Alternatively, the electric machine 18 could act as a generator and convert kinetic energy from the electrified vehicle 10 into electric energy to be stored in the battery pack 20. The electric machine 18 may act as a generator while the engine 14 is providing propulsion power for the electrified vehicle 10, for example. The electric machine 18 may additionally act as a generator during times of regenerative braking in which rotational energy from spinning the wheels 44 is transferred back through the transmission gearbox 24 and is converted into electrical energy for storage in the battery pack 20.

It should be understood that highly schematic depiction of FIG. 1 is merely exemplary and is not intended to be limiting on this disclosure. Other configurations are additionally or alternatively contemplated, and the teachings of this disclosure could be applied to any type of electrified vehicle having any type of transmission system.

Figure 2:
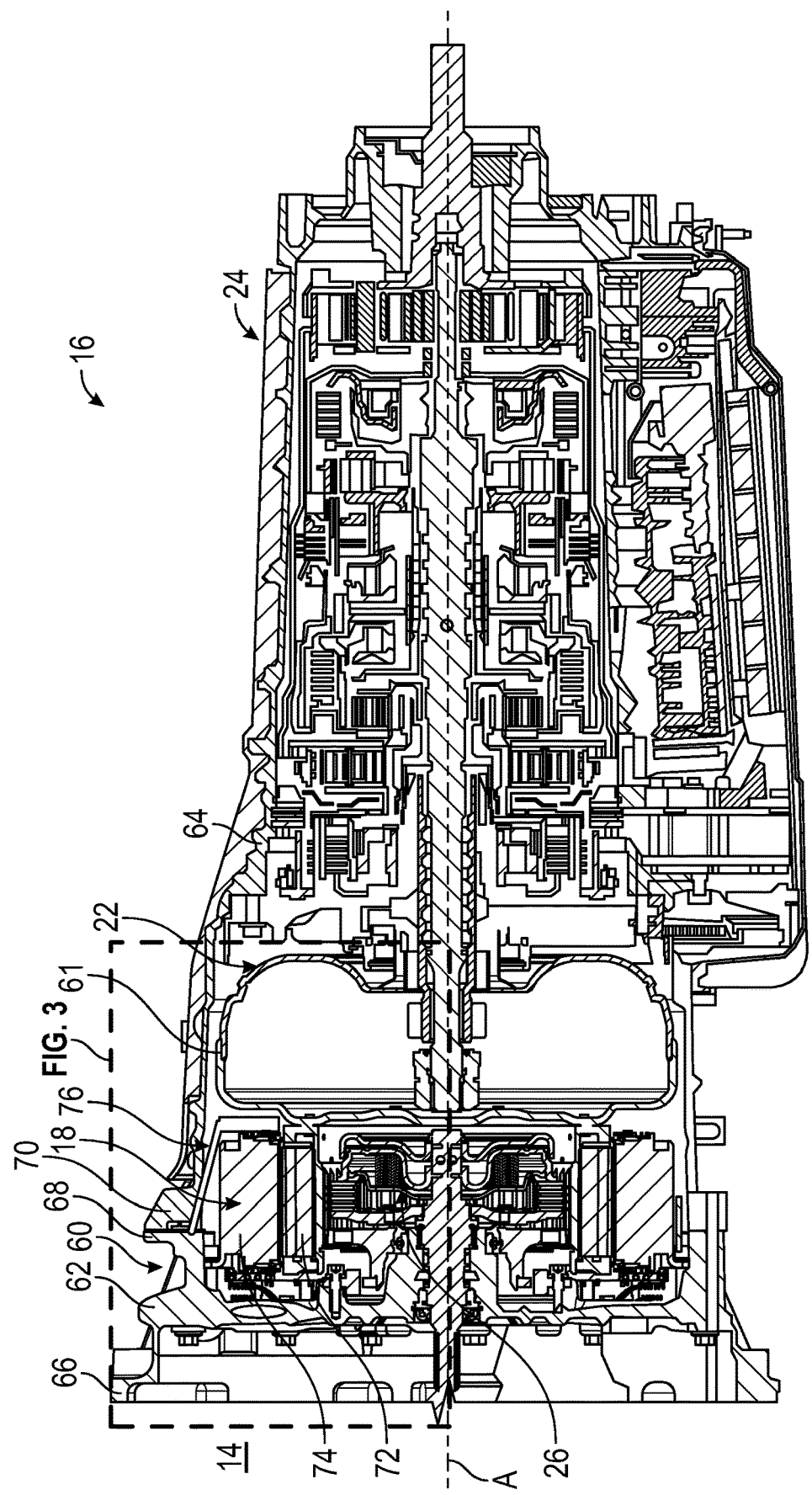
FIG. 2 is a cross-sectional view of a transmission system of an electrified vehicle.

FIG. 2 is a cross-sectional view of a transmission system 16 for an electrified vehicle, such as the electrified vehicle 10 of FIG. 1 or any other electrified vehicle that is equipped with an electric machine 18. The transmission system 16 extends along a longitudinal axis A. The transmission system 16 may include a front module 60 that is disposed axially between an engine 14 and a transmission gearbox 24. In this disclosure, an axial direction of the transmission system 16 extends in parallel with the longitudinal axis A.

A torque converter 22 is disposed axially between the front module 60 and the transmission gearbox 24. The torque converter 22 includes a housing 61 that defines a periphery that is disposed about the longitudinal axis A.

The front module 60 includes a housing 62 that at least partially encloses the electric machine 18 and an engine disconnect clutch 26. A transmission housing 64 may substantially enclose the transmission gearbox 24 and the torque converter 22. In an embodiment, the housing 62 and the transmission housing 64 cooperate together to house the electric machine 18 and the engine disconnect clutch 26. Like the housing 61, the housing 62 and the transmission housing 64 each define a periphery that is disposed about the longitudinal axis A.

The housing 62 of the front module 60 may include a first mounting flange 66 and a second mounting flange 68. The first mounting flange 66 may interface with a portion of the engine 14, and the second mounting flange 68 may mate with a corresponding mating flange 70 of the transmission housing 64. The second mounting flange 68 and the mating flange 70 mate along parallel, abutting faces, in an embodiment.

The electric machine 18 may include a rotor 72 received within a stator 74. If the electric machine 18 is used as an electric motor, rotating the rotor 72 about the longitudinal axis A provides torque for acceleration. Alternatively, if the electric machine 18 is used as a generator, rotating the rotor 72 about the longitudinal axis A can generate electric power. The rotor 72 may rotate in response to a torque input from regenerative braking, for example.

The electric machine 18 can generate heat during operation, especially when operating at low speeds and high torques, for example. The transmission system 16 may therefore be equipped with a cooling system 76 for actively managing the thermal energy levels of the electric machine 18. The performance capabilities and functionality of the electric machine 18 may be enhanced by actively managing the thermal energy levels with the cooling system 76.

Figure 3:
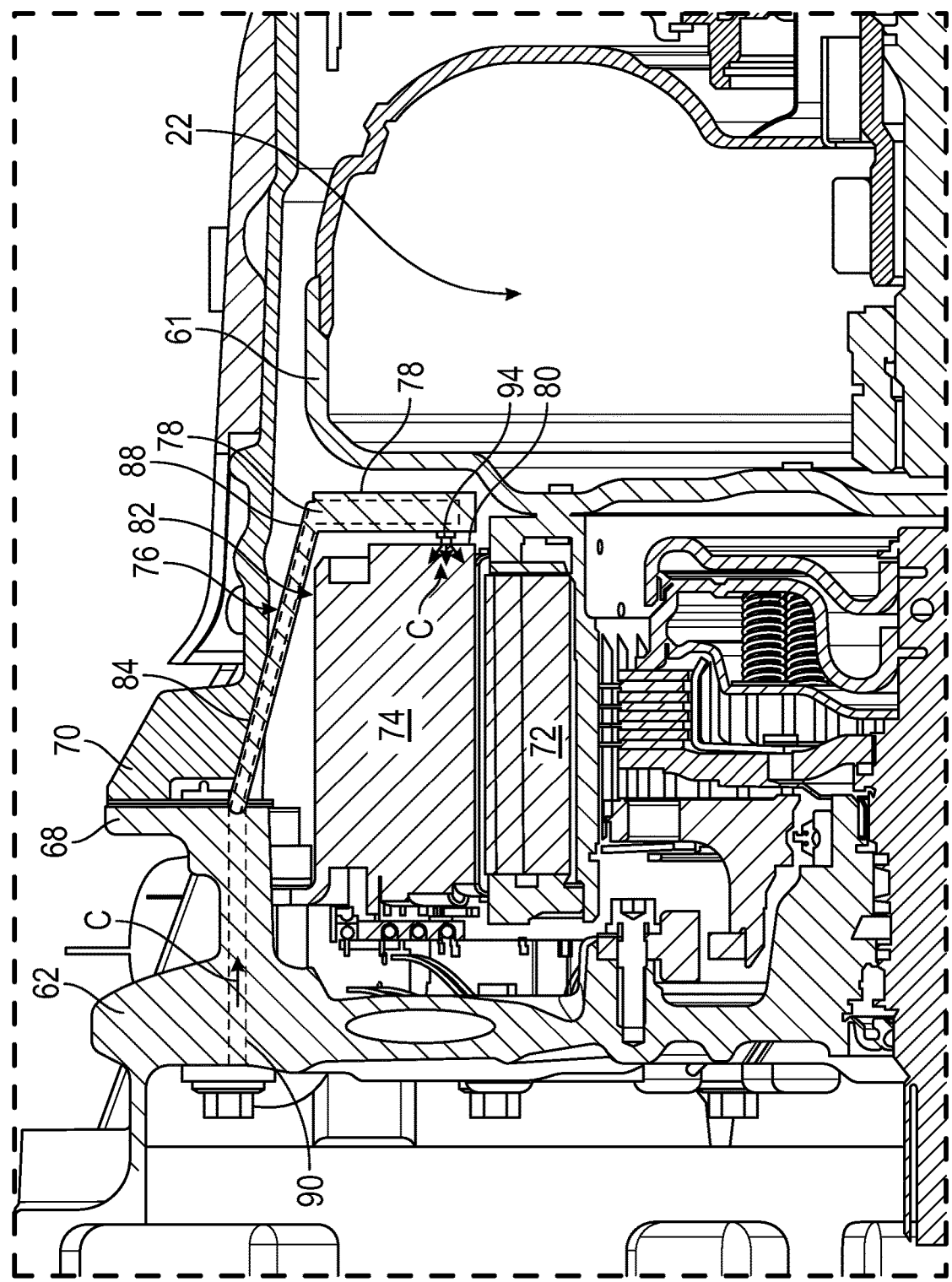
FIG. 3 is a blown up view of a portion of the transmission system of FIG. 2.

Aspects of the cooling system 76 are further illustrated with reference to FIGS. 3, 4, and 5. The cooling system 76 may include a spray bar 78. In an embodiment, the spray bar 78 is positioned axially between a rear face 80 of the stator 74 and the housing 61 of the torque converter 22 and at a location that is adjacent to a top edge 82 of the stator 74. In this example, the top edge 82 coincides with a twelve o'clock position of the stator 74 (when mounted within the transmission system 16). Thus, in an embodiment, the spray bar 78 is located closer to the twelve o'clock position of the stator 74 than the six o'clock position of the stator 74.

Figure 6:
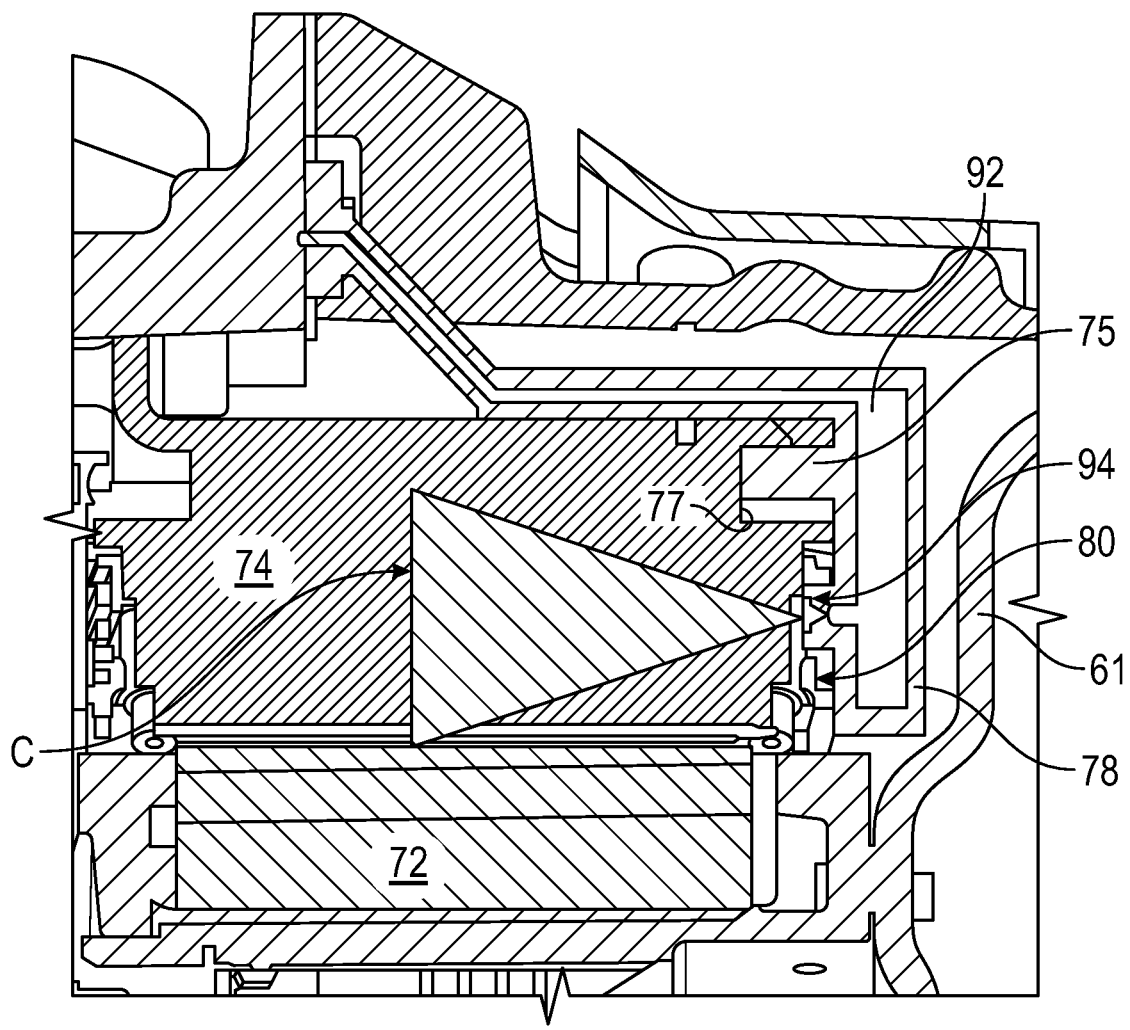
FIG. 6 illustrates an exemplary connection between a spray bar and a stator of an electric machine.

The spray bar 78 may be connected to rear face 80 of stator 74 by positioning a piloting surface 75 of the spray bar 78 within a groove 77 of the stator 74 (see, e.g., FIG. 6). However, it is not necessary to directly connect the spray bar 78 to the rear face 80 of the stator 74. Instead, the spray bar 78 may be suspended within the open space between the stator 74 and the housing 61 of the torque converter 22.

The cooling system 76 may additionally include a feed tube 84, a first mounting attachment 86, and a second mounting attachment 88. The feed tube 84 may connect between the first mounting attachment 86 and the second mounting attachment 88. In an embodiment, the first mounting attachment 86 mounts the feed tube 84 to the housing 62 of the front module 60, and the second mounting attachment 88 mounts the feed tube 84 to the spray bar 78. The second mounting attachment 88 may be either an integral component of the spray bar 78 or a separate component that is attached to the spray bar 78.

In use, coolant C (e.g., oil) that is sourced from the front module 60 may be pumped or otherwise communicated within a coolant passage 90 of the housing 62 and then into the feed tube 84. The coolant C may travel within the feed tube 84 before entering a hollow section 92 of the spray bar 78 via the second mounting attachment 88. In its mounted position, the feed tube 84 may be positioned at a declined angle for directing the coolant C to the spray bar 78. The coolant C may then be sprayed or misted through one or more nozzles 94 of the spray bar 78 for cooling the stator 74. The coolant C may be sprayed by virtue of pressure that builds up within the fluids. The spray of the coolant C may be continuous so long as pressure remains within the fluid lines. The coolant C may then matriculate to the rotor 72 and to the lower half of the stator 74 via gravity for cooling additional portions of the electric machine 18.

Figure 4:
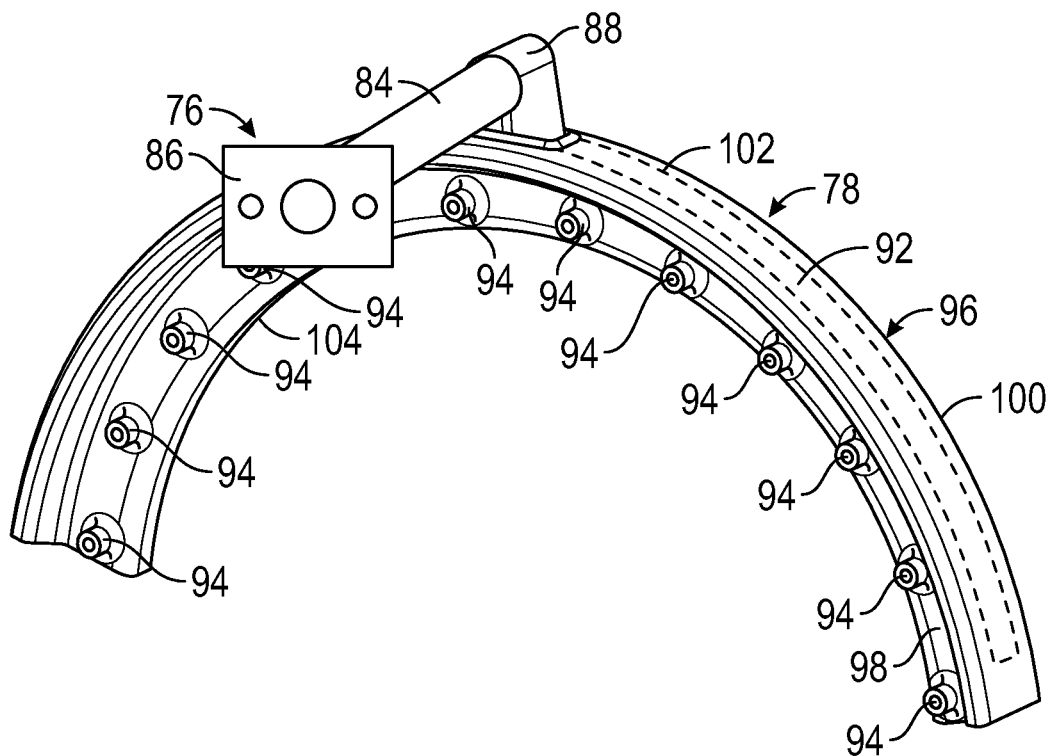
FIG. 4 illustrates an exemplary cooling system for cooling an electric machine of the transmission system of FIGS. 2-3.
Figure 5:
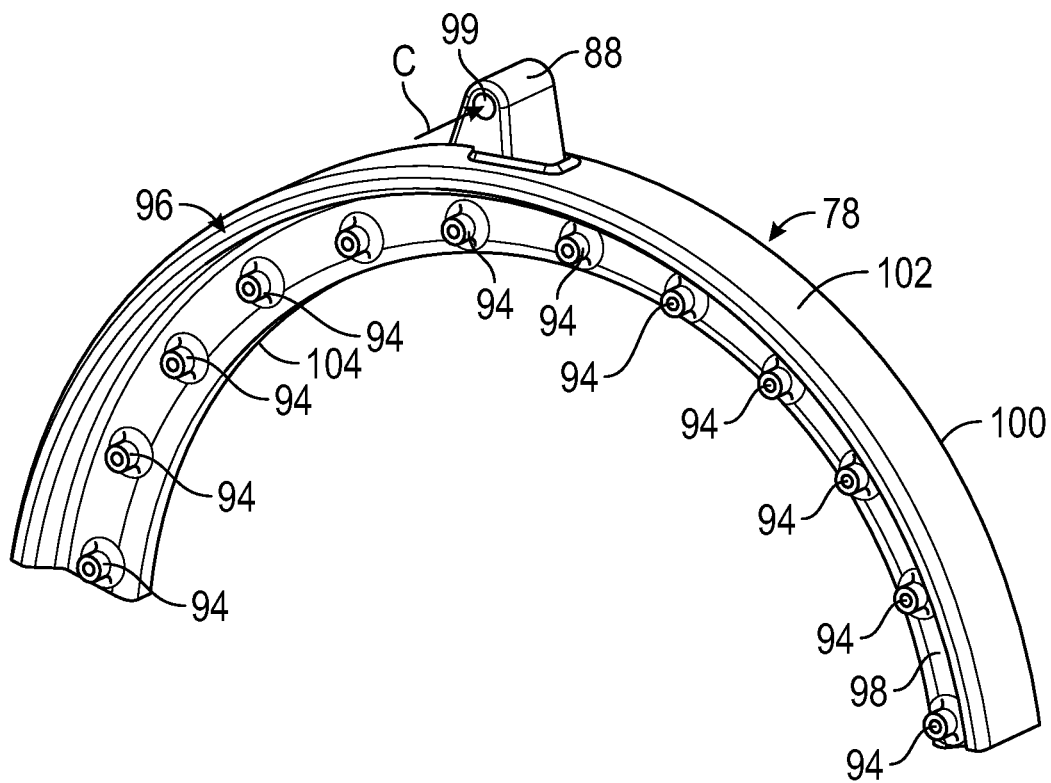
FIG. 5 illustrates an exemplary spray bar of the cooling system of FIG. 4.

Referring now primarily to FIGS. 4-5, the spray bar 78 may include a curved body 96 that includes a front face 98, a rear face 100, a top surface 102, and a bottom surface 104. When mounted within the transmission system 16, the front face 98 faces toward the rear face 80 of the stator 74, the rear face 100 faces toward the torque converter 22, the top surface 102 faces toward a twelve o'clock position of the transmission housing 64, and the bottom surface 104 faces toward a six o'clock position of the transmission housing 64. In an embodiment, the curved body 96 of the spray bar 78 is crescent shaped and is configured to cover between about 60 degrees and about 180 degrees (plus/minus 5 degrees) of the rear face 80 of the stator 74, as is further discussed below.

A plurality of the nozzles 94 may protrude from the front face 98 of the curved body 96 of the spray bar 78. The size, shape, and number of nozzles 94 that are provided on the spray bar 78 is design dependent and may be adjusted in order to provide optimal cooling of the electric machine 18 while minimizing the coolant flow rate.

The second mounting attachment 88 may extend from or be attached to the top surface 102 of the curved body 96 of the spray bar 78. The second mounting attachment 88 acts as an inlet 99 (see FIG. 5) for receiving coolant C within the hollow section 92 of the spray bar 78.

Figure 7:
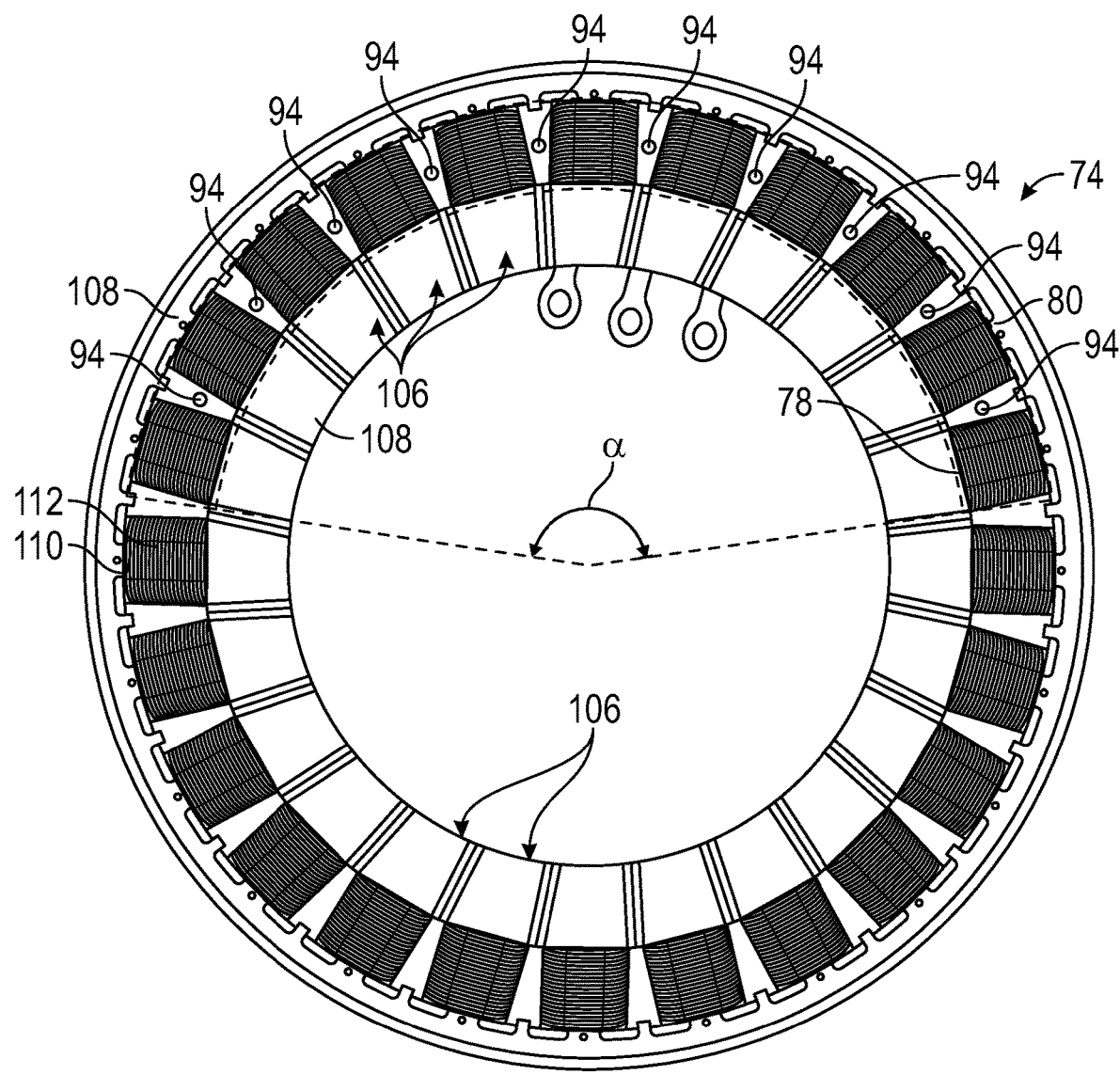
FIG. 7 illustrates an exemplary nozzle arrangement of a spray bar positioned for cooling an electric machine according to a first embodiment of this disclosure.

FIG. 7, with continued reference to FIGS. 2-5, is a rear view of the stator 74 of the electric machine 18. The stator 74 may include a plurality of back irons 106. Each back iron 106 may be made up of laminated stacks 108. Windings 110, such as copper windings, may be wound around the laminated stacks 108 of each of the back irons 106.

Figure 8:
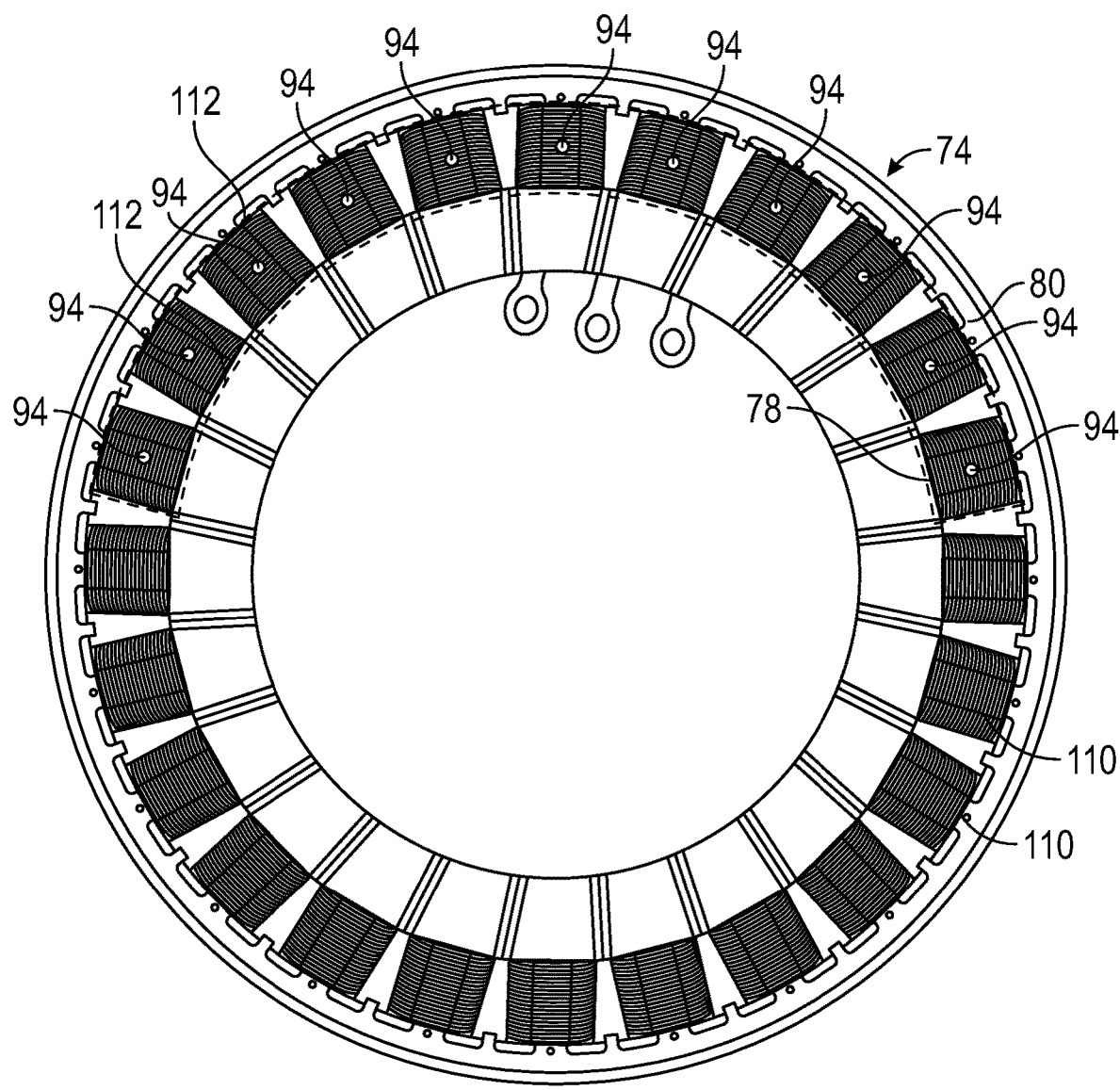
FIG. 8 illustrates an exemplary nozzle arrangement of a spray bar positioned for cooling an electric machine according to a second embodiment of this disclosure.

The spray bar 78 may be positioned relative to the rear face 80 of the stator 74 in order to direct coolant C at specific locations of the rear face 80. In an embodiment, the nozzles 94 of the spray bar 78 are positioned to direct the coolant C between adjacent back irons 106 of the stator 74. The nozzles 94 could be arranged with respect to only every other back iron 106 pair, in another embodiment. In yet another embodiment, the nozzles 94 of the spray bar 78 are positioned to direct the coolant C directly onto end windings 112 of the windings 110 of the stator 74 (see FIG. 8).

The spray bar 78 may also be positioned to provide for a specific coverage of the rear face 80 of the stator 74. For example, the spray bar 78 may span an angle α relative to the rear face 80. In an embodiment, the angle α is between 60 degrees and 180 degrees (i.e., the spray bar 78 may cover between 60 degrees and 180 degrees of the rear face 80). The specific value of the angle α is not intended to limit this disclosure.

Figure 9:
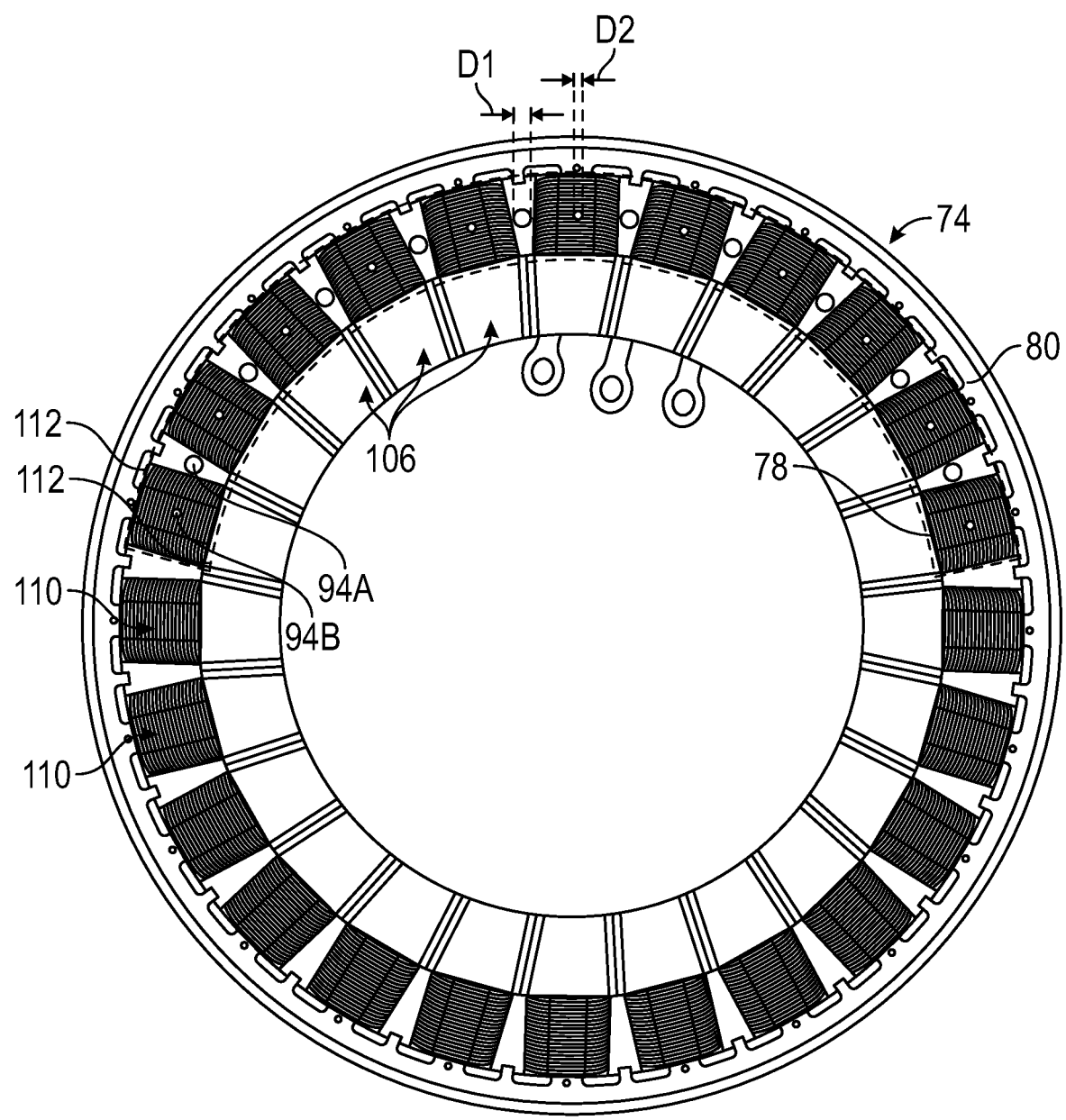
FIG. 9 illustrates an exemplary nozzle arrangement of a spray bar positioned for cooling an electric machine according to a third embodiment of this disclosure.

FIG. 9 illustrate another exemplary nozzle arrangement that can be employed by the spray bar 78. In this embodiment, the spray bar 78 includes a plurality of primary nozzles 94A and a plurality of secondary nozzles 94B. The primary nozzles 94A may be positioned to direct coolant C between adjacent back irons 106 of the stator 74, and the secondary nozzles 94B may be positioned to direct the coolant C directly onto the end windings 112 of the windings 110 of the stator 74.

In an embodiment, the primary nozzles 94A include orifices having a first diameter D1, and the secondary nozzles 94B include orifices having a second diameter D2. The second diameter D2 may be a smaller diameter than the first diameter D1.

The exemplary transmission systems of this disclosure utilize cooling systems that are positioned to occupy the typically unused space between the stator and torque converter of the transmission system. Implementation of the proposed cooling systems therefore requires minimal changes to existing electric machine and torque converter architecture. Spray bars of the cooling systems are configured to spray/mist coolant onto the rear face of the stator and then rely on gravity for cooling the remaining portions of the electric machine. Actively cooling the stator in this manner allows the electric machine to operate at higher torques and speeds, thereby increasing its performance capabilities.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A transmission system, comprising:
an electric machine including a rotor and a stator;
a spray bar positioned adjacent to a face of the stator; and
a first nozzle of the spray bar configured to direct a coolant between adjacent back irons of the stator.

2. The transmission system as recited in claim 1, wherein the spray bar is positioned axially between a rear face of stator and a torque converter of the transmission system.

3. The transmission system as recited in claim 2, wherein the spray bar is located near a top edge of the stator that coincides with a twelve o'clock position of the stator in its mounted position within the transmission system.

4. The transmission system as recited in claim 1, wherein the spray bar includes a crescent shaped body.

5. The transmission system as recited in claim 1, wherein the spray bar covers between 60 degrees and 180 degrees of the face of stator.

6. The transmission system as recited in claim 1, wherein the first nozzle is configured to direct the coolant between the adjacent back irons of the stator, and comprising a second nozzle configured to direct the coolant onto end windings of the stator.

7. The transmission system as recited in claim 6, wherein the first nozzle includes a first orifice having a first diameter and the second nozzle includes a second orifice having a second diameter, wherein the first diameter is larger than the second diameter.

8. The transmission system as recited in claim 1, wherein the spray bar is directly attached to a face of the stator.

9. The transmission system as recited in claim 1, wherein the spray bar is suspended within an open space defined between a rear face of the stator and a torque converter housing.

10. A transmission system, comprising:
an electric machine including a rotor and a stator;
a spray bar positioned adjacent to a rear face of the stator; and
a first nozzle of the spray bar configured to direct a coolant between adjacent back irons of the stator, onto end windings of the stator, or both,
wherein the spray bar is directly attached to the rear face of the stator,
wherein the spray bar includes a piloting surface received within a groove of the stator.

11. An electrified vehicle, comprising:
a front module at least partially housing an electric machine;
a transmission gearbox aft of the front module;
a torque converter located axially between the front module and the transmission gearbox; and
a spray bar positioned axially between a rear face of a stator of the electric machine and a housing of the torque converter,
wherein the spray bar includes a piloting surface received within a groove formed in the face of the stator or is suspended within an open space defined between the face of the stator and a housing of the torque converter.

12. The electrified vehicle as recited in claim 11, comprising a feed tube connected to the front module by a first mounting attachment and connected to the spray bar by a second mounting attachment.

13. The electrified vehicle as recited in claim 12, wherein the feed tube is in fluid communication with a coolant passage formed in the front module at the first mounting attachment and is in fluid communication with a hollow section of the spray bar at the second mounting attachment.

14. The electrified vehicle as recited in claim 11, wherein the spray bar includes a crescent shaped body.

15. The electrified vehicle as recited in claim 11, wherein the spray bar covers between 60 degrees and 180 degrees of the rear face of stator.

16. The electrified vehicle as recited in claim 11, wherein the spray bar is located near a top edge of the stator, and the top edge coincides with a twelve o'clock position of the stator.

17. The electrified vehicle as recited in claim 11, wherein the spray bar includes a plurality of nozzles that protrude from a front face of the spray bar.

18. The electrified vehicle as recited in claim 17, wherein a first portion of the plurality of nozzles is configured to direct a coolant between adjacent back irons of the stator and a second portion of the plurality of nozzles is configured to direct the coolant onto end windings of the stator.

19. The electrified vehicle as recited in claim 18, wherein the first portion of the plurality of nozzles includes a first orifice having a first diameter and the second portion of the plurality of nozzles includes a second orifice having a second diameter, wherein the first diameter is larger than the second diameter.

20. The electrified vehicle as recited in claim 11, wherein the spray bar is positioned relative to a top edge of the stator but not relative to a bottom edge of the stator.

* * * * *

UNITED STATES PATENT AND TRADEMARK OFFICE
CERTIFICATE OF CORRECTION

| | | |
|---|---|---|
| PATENT NO. | : 10,892,668 B2 | Page 1 of 1 |
| APPLICATION NO. | : 16/382524 | |
| DATED | : January 12, 2021 | |
| INVENTOR(S) | : Thomas Mcbride et al. | |

It is certified that error appears in the above-identified patent and that said Letters Patent is hereby corrected as shown below:

In the Claims

In Claim 8, Column 11, Line 38; replace "face" with --rear face--

In Claim 15, Column 12, Line 29; replace "stator" with --the stator--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*